(12) United States Patent
Wimmer

(10) Patent No.: US 9,630,678 B2
(45) Date of Patent: Apr. 25, 2017

(54) TELESCOPIC SUSPENSION FORK LEG WITH EQUALIZING VOLUME FOR DAMPING FLUID

(75) Inventor: Johannes Wimmer, Kastl (DE)

(73) Assignee: WP Suspension Austria GmbH, Munderfing (AT)

( * ) Notice: Subject to any disclaimer, the term of this patent is extended or adjusted under 35 U.S.C. 154(b) by 793 days.

(21) Appl. No.: 13/355,508

(22) Filed: Jan. 21, 2012

(65) Prior Publication Data

US 2012/0187652 A1 Jul. 26, 2012

(30) Foreign Application Priority Data

Jan. 21, 2011 (DE) .......................... 10 2011 000 280

(51) Int. Cl.
*B62K 25/06* (2006.01)
*B62K 25/08* (2006.01)
*F16F 9/06* (2006.01)

(52) U.S. Cl.
CPC .............. *B62K 25/08* (2013.01); *F16F 9/064* (2013.01); *F16F 9/067* (2013.01); *B60G 2300/12* (2013.01)

(58) Field of Classification Search
CPC .......... B62K 25/08; F16F 9/064; F16F 9/067; B60G 2300/12
USPC ........................................ 280/279, 276, 280
See application file for complete search history.

(56) References Cited

U.S. PATENT DOCUMENTS

| 6,234,505 | B1 | 5/2001 | Ito |
| 6,260,832 | B1 * | 7/2001 | Vignocchi et al. ......... 267/64.15 |
| 6,520,524 | B1 * | 2/2003 | Costa .............................. 280/276 |
| 8,317,171 | B2 * | 11/2012 | Inoue ............................. 267/218 |
| 2003/0001358 | A1 * | 1/2003 | Becker et al. ................ 280/276 |
| 2006/0137947 | A1 | 6/2006 | Fujita |
| 2006/0225978 | A1 | 10/2006 | Yun |
| 2007/0056817 | A1 | 3/2007 | Ward |
| 2008/0105505 | A1 | 5/2008 | Furuya |
| 2008/0230335 | A1 | 9/2008 | Furuya et al. |
| 2010/0207350 | A1 | 8/2010 | Uchiyama et al. |
| 2010/0263971 | A1 | 10/2010 | Lee et al. |

FOREIGN PATENT DOCUMENTS

| DE | 940 033 | 3/1956 |
| DE | 1 146 312 | 3/1963 |
| DE | 27 42 700 A1 | 3/1978 |
| DE | 102 58 815 A1 | 7/2004 |
| DE | 10 2007 028 634 A1 | 1/2009 |

(Continued)

*Primary Examiner* — Joseph Rocca
*Assistant Examiner* — Marlon A Arce
(74) *Attorney, Agent, or Firm* — Rod D. Baker

(57) ABSTRACT

A telescopic suspension fork leg, such as may be using in conjunction with a motorcycle. The fork leg has an inner tube and an outer tube, a damping arrangement, and a spring arrangement which is arranged inside a first chamber formed in the outer tube and resting opposite a second chamber formed by the damping arrangement and arranged beneath the first chamber. The telescopic suspension fork leg features a compressible equalizing volume for a damping fluid volume displaced by a piston rod. The equalizing volume is provided generally concentrically between a damping tube and a separating piston. The separating piston fluidically separates the equalizing volume from an annular space chamber.

20 Claims, 7 Drawing Sheets

(56) References Cited

FOREIGN PATENT DOCUMENTS

| | | |
|---|---|---|
| EP | 1 666 348 A2 | 6/2006 |
| EP | 1 886 912 A1 | 2/2008 |
| EP | 2 017 495 A1 | 1/2009 |
| JP | 05-263826 A | 10/1993 |
| JP | H06-4442 U | 1/1994 |
| JP | 2000-320598 | 11/2000 |
| JP | 2004-019693 A | 1/2004 |
| JP | 2008-057637 A | 3/2008 |
| JP | 2010-127327 A | 6/2010 |
| JP | 2010-168002 A | 8/2010 |
| WO | WO 2007/046750 A1 | 4/2007 |
| WO | WO 2008/085097 A1 | 7/2008 |

\* cited by examiner

TELESCOPIC SUSPENSION FORK LEG
WITH EQUALIZING VOLUME FOR
DAMPING FLUID

CROSS-REFERENCE TO RELATED APPLICATIONS

This application claims priority to German Patent Application No. DE 10 2011 000 280.4, filed on 21 Jan. 2011, the entirety of which is incorporated herein by reference. This application is related to U.S. patent application Ser. No. 13/355,176, entitled "Telescopic Suspension Fork Leg and Telescopic Fork Provided Therewith," filed on 20 Jan. 2012, and the entirety thereof is incorporated herein by reference.

BACKGROUND OF THE INVENTION

Field of the Invention

The present invention relates to telescopic suspension fork legs, such as fork legs used in conjunction with motorcycles and the like, and more specifically to a suspension fork leg with an inner tube, and an outer tube, and with a particular damping arrangement and a spring arrangement.

The telescopic suspension fork leg apparatus according to this disclosure can be used, for example, for the formation of a telescopic suspension fork, also abbreviated to "telefork," which is used on a motorcycle or, for example, on a bicycle. Such a telescopic fork fulfils the function of guiding a front wheel of the vehicle in question, undertakes the task of suspension, and serves for damping when the vehicle moves over uneven areas of the roadway. The instant apparatus therefore provides that the spring movement subsides rapidly again, and also serves to support a braking moment which is built up upon the braking of the front wheel as a reaction moment, relative to the frame of the vehicle.

Background Art

To bring about a damping function for the damping of the oscillating movement of the inner tube and of the outer tube relative to each other, the damping arrangements of known suspension fork legs have bores, through which a damping fluid in the form, for example, of telescopic fork oil, can flow. To bring about a required characteristic in response to the respective specification of the rider (or respectively as a reaction to the condition of the roadway surface), a damping arrangement commonly possesses generally adjustable valve arrangements, via which the through-flow behavior of the damping fluid can be regulated.

When the damping fluid flows through the bores (or respectively the valves), very high local flow speeds are formed, which are so great that gas bubbles develop owing to a gaseous fluid phase, and cavitation often occurs. In order to avoid the formation of cavitation, the damping fluid is placed under high pressure, so that the formation even of gas bubbles can not occur.

A front wheel fork for a two-wheeled vehicle is known from publication WO 2008/085097 A1. In this known front wheel fork, a telescopic suspension fork leg is provided which has an inner tube and an outer tube and a damping arrangement and also a spring. The spring is arranged here in a first volume O1, while the damping arrangement has a second volume O2, which volumes are sealed hermetically with respect to each other. The damping arrangement of this known front wheel fork has two fluid volumes which are separated from each other, and which can be optionally connected with an equalizing reservoir. In this known type of front wheel fork, it is regarded as disadvantageous that the fluid in the first chamber, which holds the spring arrangement, can mix with the fluid in the damping arrangement. For this reason a third volume is provided, which preferably is filled with air and is intended to prevent a direct contact between the first volume O1 and the second volume O2.

By publication WO 2007/046750 A1 a front wheel fork is known which has a damping arrangement according to the so-called "closed cartridge" principle. This known front wheel fork here has a main spring arranged in the inner tube which is penetrated by a piston rod. On the piston rod, a damper piston is arranged which can carry out a back-and-forth movement in an inner tube of the damper arrangement. In so doing, the piston displaces a damping fluid, present in the damping arrangement, out from the interior of the inner tube via apertures which are connected with an annular space arranged coaxially to the interior of the damping tube. The annular space is in turn in fluid communication with a return flow chamber constructed in the inner tube of the damping arrangement, so that both the upper and the lower piston surface of the damping piston are in contact with the damping fluid. With the oscillating movement of the damping piston, the damping fluid is therefore conveyed from the compression chamber into the return flow chamber, wherein the compression chamber and the return flow chamber change over as a function of the stroke movement of the damping piston.

Such a system operating with parallel damping has the purported advantage that the damping fluid is constantly under pressure and in this way cavitation is prevented.

By German application DE 10 2007 028 634 A1, a shock absorber has become known with a piston rod and with a damping piston arranged thereon, which divides the working cylinder into two working chambers, wherein a balloon filled with gas is situated in one working chamber.

From EP 2 017 495 A1, a telescopic suspension fork leg has become known, and which possesses a damping piston in the region of a gripping clamp and has a separating piston which is movable relative to the piston rod.

By JP-2010-127327A, a telescopic suspension fork has become known with an outer tube and an inner tube arranged concentrically thereto. Inside the inner tube there is a gas volume and a separating piston, which is guided radially internally and sealed radially externally on the inner tube.

Known from publication US 2008/0105505 A1 is a telescopic suspension fork leg with an outer tube and with an inner tube provided concentrically thereto. On the inner tube, a separating piston is provided, sealed in both axial directions, which separates a gas volume from an oil volume and is acted upon by a spring arrangement.

Publication US 2010/0263971 A1 shows a damping arrangement which is filled with a magneto-rheological fluid and has a separating piston which seals the fluid with respect to a gas spring.

Finally, by publication US 2007/0056817 A1 a damping arrangement is known to have a first outer tube and an inner tube arranged coaxially thereto, and with a coaxial second outer tube, surrounding the inner tube, which second outer tube has a smaller external diameter than the first outer tube. Between the inner tube and the second outer tube a damping fluid can flow, which can act upon a damping piston, arranged inside the inner tube, on both piston surface sides. In the annular space region between the second and first outer tube, a separating piston is provided which seals a space, filled with a damping fluid, with respect to an air chamber and therefore is provided with sealing arrangements with respect both to the first and also to the second outer tube.

The disclosures of the foregoing publications are incorporated herein by reference.

In a further known telescopic suspension fork leg, an equalizing volume, which is provided for the damping fluid displaced by the damping piston, is provided outside the telescopic suspension fork leg and is sealed with respect to a gas spring via a sealing arrangement. Naturally, such a known telescopic suspension fork leg takes up a large installation space. If the telescopic suspension fork leg is arranged on a motorcycle, installation space is available only to a limited extent. If the equalizing volume is arranged separated from the telescopic suspension fork leg, then a fluid-conducting connection must be provided between the telescopic suspension fork leg and the equalizing volume, which can be constructed (for example) as a pressure hose. Such an external pressure hose is naturally liable to damage, which is disadvantageous in particular in motorcycles which are also moved on uneven ground.

If the additional equalizing volume is provided in the region between the damping pressure chamber and the gripping clamp, then this leads to a lengthening of the telescopic suspension fork leg in axial direction. As off-road sports motorcycles are in any case regularly equipped with large spring travels, such an axially longer embodiment of the telescopic suspension fork leg (and the telescopic fork provided therewith) leads to an undesirable rise in the motorcycle's seat height, entailing loss of comfort; further, the center of gravity of the motorcycle is raised. The same disadvantages are also produced when the equalizing volume is provided at the upper end of the telescopic suspension fork leg and in axial connection to the main spring.

SUMMARY OF THE INVENTION

Owing to the high demands which are placed on a telescopic fork, a telescopic suspension fork leg which is used for the formation of the telescopic fork here described possesses a plurality of functionalities and components, by which, for example, the spring characteristic and the damping characteristic of the telescopic suspension fork leg can be influenced.

The present invention addresses the problem of providing a telescopic suspension fork leg and a telescopic suspension fork equipped therewith, which avoids the above-mentioned disadvantages, has a compact construction, and furthermore can be manufactured with fewer components and is therefore constructed at a more favorable cost.

To solve this problem, the invention provides a telescopic suspension fork leg with beneficial features. Advantageous embodiments hereof are described in the further claims. Furthermore, the invention also provides a telescopic suspension fork with the features of the described telescopic suspension fork leg disclosed herein.

Accordingly, a telescopic suspension fork leg is disclosed, with an inner tube, an outer tube, and a damping arrangement and a spring arrangement. The spring arrangement is disposed inside a first chamber formed in the outer tube and rests opposite a second chamber formed by the damping arrangement and arranged beneath the first chamber, which chamber is constructed to receive a damping fluid, wherein the damping arrangement has a piston, resting on a piston rod, with an upper and a lower piston surface, and the piston is movable within a damping tube arranged substantially concentrically to the inner tube, and the damping tube is surrounded by an annular space chamber arranged substantially concentrically to the damping tube; the telescopic suspension fork leg has a compressible equalizing volume for a damping fluid volume which is displaced by the piston rod, wherein the equalizing volume is provided substantially concentrically between the damping tube and a separating piston separating the equalizing volume fluidically from the annular space chamber.

Thereby, the apparatus according to this disclosure provides a configuration of a telescopic suspension fork leg in which the equalizing volume is provided substantially concentrically between the damping tube and a separating piston separating the equalizing volume from the annular space chamber. In this configuration, the separating piston can be provided concentrically to the damping tube, thus does not take up any additional installation space above or beneath the damping tube, and therefore also does not require that the telescopic suspension fork leg be formed to be axially longer than is necessary for achieving the intended spring travel. Owing to the concentric arrangement to the damping tube, the equalizing volume is situated in an annular space defined around the damping tube and in a region radially outside the damping tube and enclosed by the separating piston.

For this purpose, according to a further development the present apparatus provides that the separating piston is arranged concentrically to the damping tube inside the annular space chamber, and has a differential piston surface which is acted upon by the pressure in the annular space chamber for movement relative to the piston. The differential piston surface is constructed such that it can act upon the separating piston with a movement in the direction towards the piston or away from the piston.

Through the concentric arrangement of the separating piston to the damping tube, a configuration of the telescopic suspension fork leg is provided which saves space and reduces axial installation space; the equalizing volume is situated radially inside the separating piston, i.e., in an annular space chamber which is created from the region radially outside the damping tube and radially inside the separating piston.

The separating piston is arranged inside the annular space chamber, which is defined radially outside the damping tube and radially inside the inner tube. The damping fluid which is displaced by the damping piston flows through this annular space chamber during its movement from the underside of the piston to the upper side of the piston; the annular space chamber is therefore under system pressure. This system pressure is imparted against the separating piston on all sides, so that the force components acting upon the radial outer regions of the separating piston cancel each other out reciprocally.

The separating piston is constructed such that it has an upper piston surface, acted upon by the system pressure, which is larger than the lower piston surface, which is likewise acted upon by the system pressure; therefore a differential piston surface is present, which is acted upon by the system pressure in the annular space chamber. This differential piston surface is provided on the separating piston such that the pressure application by the system pressure leads to the separating piston being moved in the direction away from the damping piston. If, therefore, a compression process takes place in the telescopic suspension fork leg according to this disclosure, then through the damping piston which is displaced in the damping tube, the pressure rises beneath the damping piston.

The damping fluid which is moved and displaced by the damping piston and by the piston rod arrives via a valve arrangement into the region of the annular space chamber, and acts there upon the differential piston surface of the separating piston. The latter is moved away from the damping piston, and compresses a gas volume which is present in the equalizing volume. The volume difference, through the compressing of the gas volume, corresponds here to the volume of the piston rod arranged on the damping piston and plunging into the damping system, because the piston rod plunging into the damping system displaces damping fluid which is present in the damping tube filled with damping fluid, further because in the telescopic suspension fork leg, operating by the closed cartridge principle, the return flow chamber is also filled with damping fluid.

In this manner, the volume which is enclosed by the separating piston makes available an equalizing volume for the damping fluid displaced by the piston rod on the plunging process of the telescopic suspension fork leg.

According to a further development of the present disclosure, provision is made that the separating piston is prestressed against the force exerted by the differential piston surface by means of a spring arrangement which is arranged between an end face of the separating piston and a closure body in the shape of a pipe section. In other words, a spring arrangement can also be provided inside the equalizing volume, which prestresses the separating piston against the pressure force which is exerted by the system pressure acting on the resulting differential piston surface. Furthermore, the spring arrangement of course also receives the weight force of the separating piston. The spring arrangement therefore supports the gas volume enclosed in the equalizing volume on the application of pressure by the damping piston and the piston rod.

The separating piston can rest here via the spring arrangement on a closure body in the shape of a pipe section. This closure body is provided in the region of the lower end of the telescopic suspension fork leg adjacent to the gripping clamp.

Quite generally, the separating piston can be a body in the shape of a pipe section, which is arranged displaceably by means of two guide bushings on the damping tube and the closure body, in the shape of a pipe section, arranged concentrically to the damping tube, and which defines the equalizing volume between an outer periphery surface of the damping tube and an inner periphery surface by means of sealing arrangements arranged therebetween.

The two guide bushings provide that a tilting of the separating piston is ruled out and are situated arranged in a region of the annular space chamber surrounded by damping fluid, i.e., outside the region of the equalizing volume, which is formed inside sealing arrangements which are arranged on the separating piston. The sealing arrangements enclose a region radially outside the damping tube and radially inside the inner periphery surface of the separating piston.

According to a further development of the present disclosure, the separating piston can have an outer contour in the shape of a truncated cone at its end region lying opposite the gripping clamp of the telescopic suspension fork leg. One of the guide sleeves can be provided here radially inside a through-bore arranged in the truncated cone-shaped construction, which through-bore surrounds the damping tube.

In a further development of this disclosure, the telescopic suspension fork leg can have a valve arrangement in the form, for example, of a base valve which connects the damping tube fluidically with the annular space chamber on reaching a predetermined damping pressure in the damping tube, so that at least a portion of the damping fluid which is displaced out from the damping tube by the lower piston surface can be displaced via the annular space chamber for acting upon the upper piston surface. In this manner, the second chamber outside the damping tube is always under system pressure, so that the formation of gas bubbles is effectively avoided on the rapid flowing through of the damping fluid through valve arrangements of the telescopic suspension fork leg.

According to a further development of the disclosure, provision is also made that the piston has a fluid passage, able to be freed by a valve arrangement, which passage extends between the lower and upper piston surfaces and is able to be freed by means of valve arrangements, able to be actuated by damping pressure, through which damping fluid may pass.

It was mentioned above that a base valve is also provided on the base side of the damping tube, through which damping fluid can be displaced out from the damping tube and into the annular space chamber. If, on the compression process of the telescopic suspension fork leg, the damping piston is displaced in the direction towards the base valve, then a partial volume flow of the displaced damping fluid passes through the base valve and into the annular space chamber. Another partial volume flow can pass through the fluid passage in the piston, and enters directly from the compression chamber into the return flow chamber. The partial volumes can be adapted by a corresponding adaptation of the spring rigidities of the closure body closing the fluid passage of the base valve and of the piston, in the form for example of shims.

According to a further development of this disclosure, the telescopic suspension fork leg can also have a non-return valve which, on rising damping pressure in the damping tube above the upper piston surface, prevents a flow of damping fluid from the upper piston surface in the direction towards the lower piston surface. Such a situation can exist on the extension process of the telescopic suspension fork leg. If the extension process occurs, then the damping fluid which is displaced by the upwardly moving piston flows through the fluid passage in the piston from the piston upper side in the direction towards the piston underside. In so doing, the section of the piston rod plunging into the damping arrangement on the compression process comes out from the damping arrangement again and the volume of damping fluid which is no longer displaced by the piston rod is pushed back by the separating piston, which is under spring preload, into the damping tube into the region beneath the lower piston surface.

For this purpose, a non-return valve can be provided, which frees a fluid flow between the annular space chamber and the damping tube in the direction towards the lower piston surface when the latter moves in the direction away from the separating piston.

Finally, according to a further development of this disclosure, provision is also made that the piston has a fluid duct through which damping fluid volume can flow from the compression chamber into the return flow chamber and vice versa. This fluid duct can be freed and blocked by means of a valve arrangement which is able to be adjusted from the exterior. Thereby, the damping behavior of the telescopic suspension fork leg according to the invention can be adjusted.

BRIEF DESCRIPTION OF THE DRAWINGS

The invention will now be described with reference to the drawing wherein.

DESCRIPTION OF PREFERRED EMBODIMENTS

Figure 1:
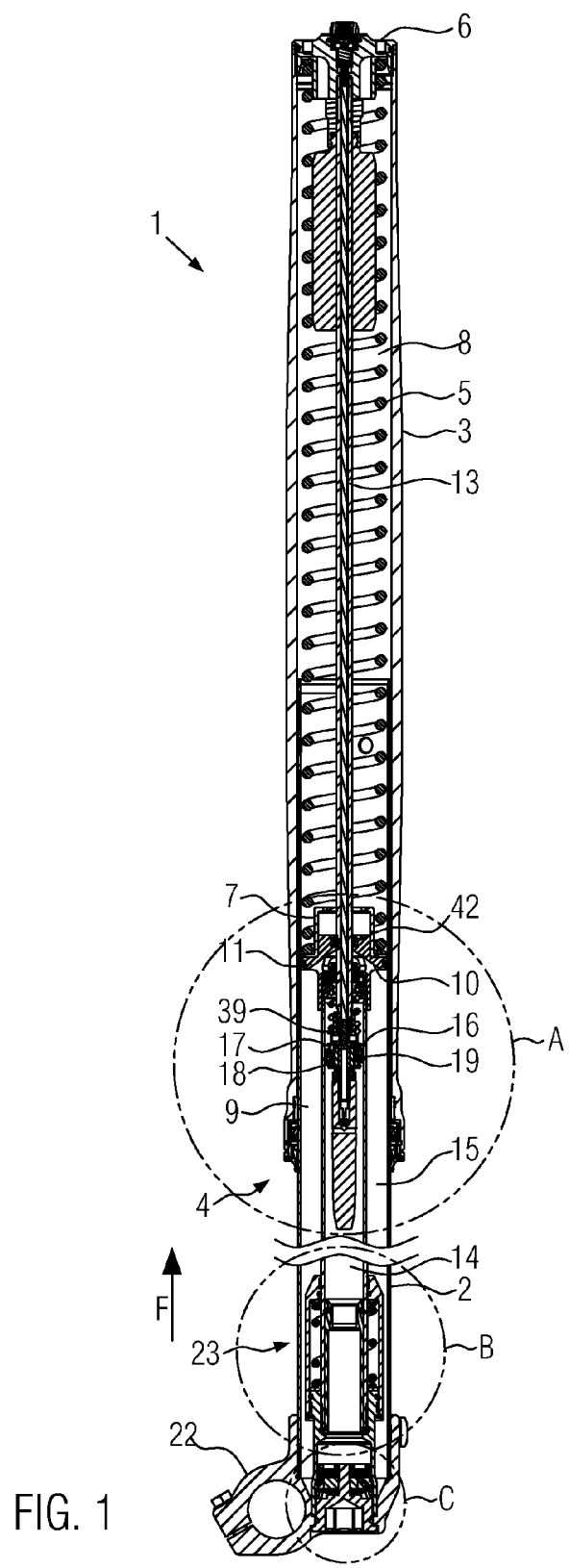
FIG. 1 is a longitudinal sectional view of a telescopic suspension fork leg, in an extended condition, according to an embodiment of the apparatus in accordance with the present disclosure.
Figure 5:
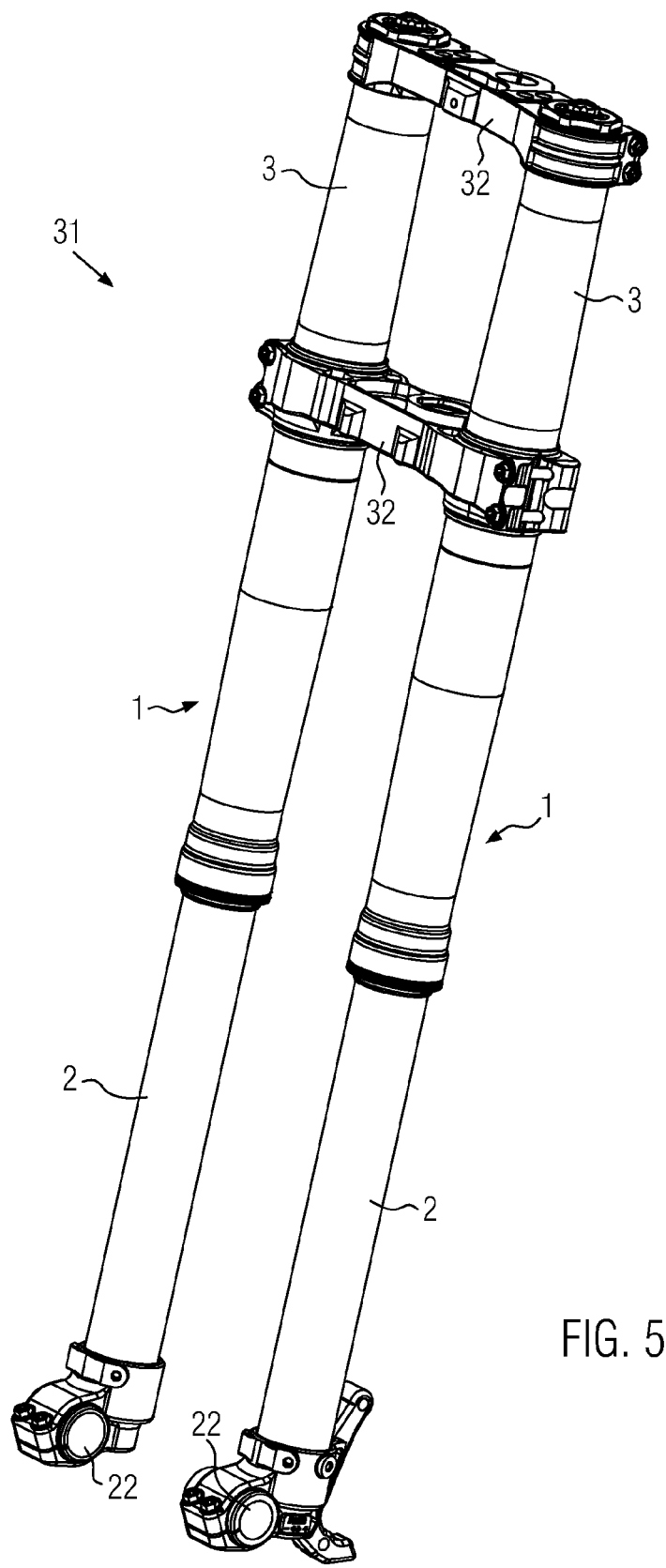
FIG. 5 is a perspective view of a telescopic suspension fork, which has two telescopic suspension fork legs according to the embodiment of FIG. 1.

Attention is invited to FIG. 1 of the drawings, showing a longitudinal sectional illustration of an embodiment of a single telescopic suspension fork leg 1 in accordance with the present invention. Two such suspension fork legs 1, 1 as configured for use are seen in FIG. 5.

The telescopic suspension fork leg 1 has here an inner tube 2, an outer tube 3, a damping arrangement 4 and a spring arrangement 5 preferably in the form of a main spring.

The main spring 5 rests on a closure cover 6 arranged at the upper end of the telescopic suspension fork leg 1 and, at the lower end of the main spring 5, on a cover 7 which is constructed to have a cup shape. The main spring 5 is arranged here in a first chamber 8 which is filled with an oil-air mixture. Beneath the first chamber 8, a second chamber 9 is provided which is completely filled with damping fluid in the form of suitable fork oil.

Beneath the cover 7 a cartridge cover 10 is provided in the telescopic suspension fork leg 1, constructed in accordance with the "closed cartridge" principle.

A sealing arrangement 11, and a piston rod seal 42 arranged on a piston rod, effectively seal in a fluid-tight manner the first chamber 8 with respect to the interior of the second chamber 9.

A damping tube 12, arranged substantially concentrically to the inner tube 2, is provided inside the second chamber 9. The damping tube 12 is overlapped and enclosed here at its upper end by the cartridge cover 10. Proceeding from the closure cover 6, a piston rod 13 extends through the cover 7 and the cartridge cover 10, up into the interior volume or region 14 of the damping tube 12. The interior volume 14 is filled completely with damping fluid, as is an annular space chamber 15 defined inside the second chamber 9 concentrically to the damping tube 12.

At the lower end of the piston rod 13, a piston 16 is arranged which has an upper piston surface 17 and a lower piston surface 18. The piston 16 has a sealing arrangement 19 radially externally, which prevents a free through-flow past the piston of damping fluid in the volume 14 from the region beneath the lower piston surface 18 to the region above the upper piston surface 17.

Figure 3:
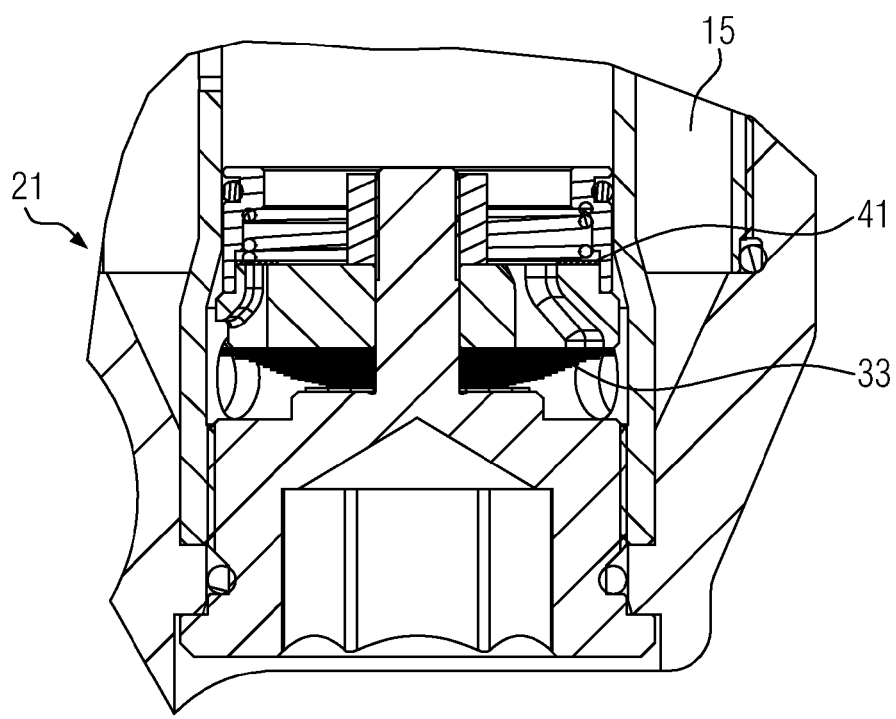
FIG. 3 is an enlarged view of the details of portion "C" according to FIG. 1.
Figure 4:
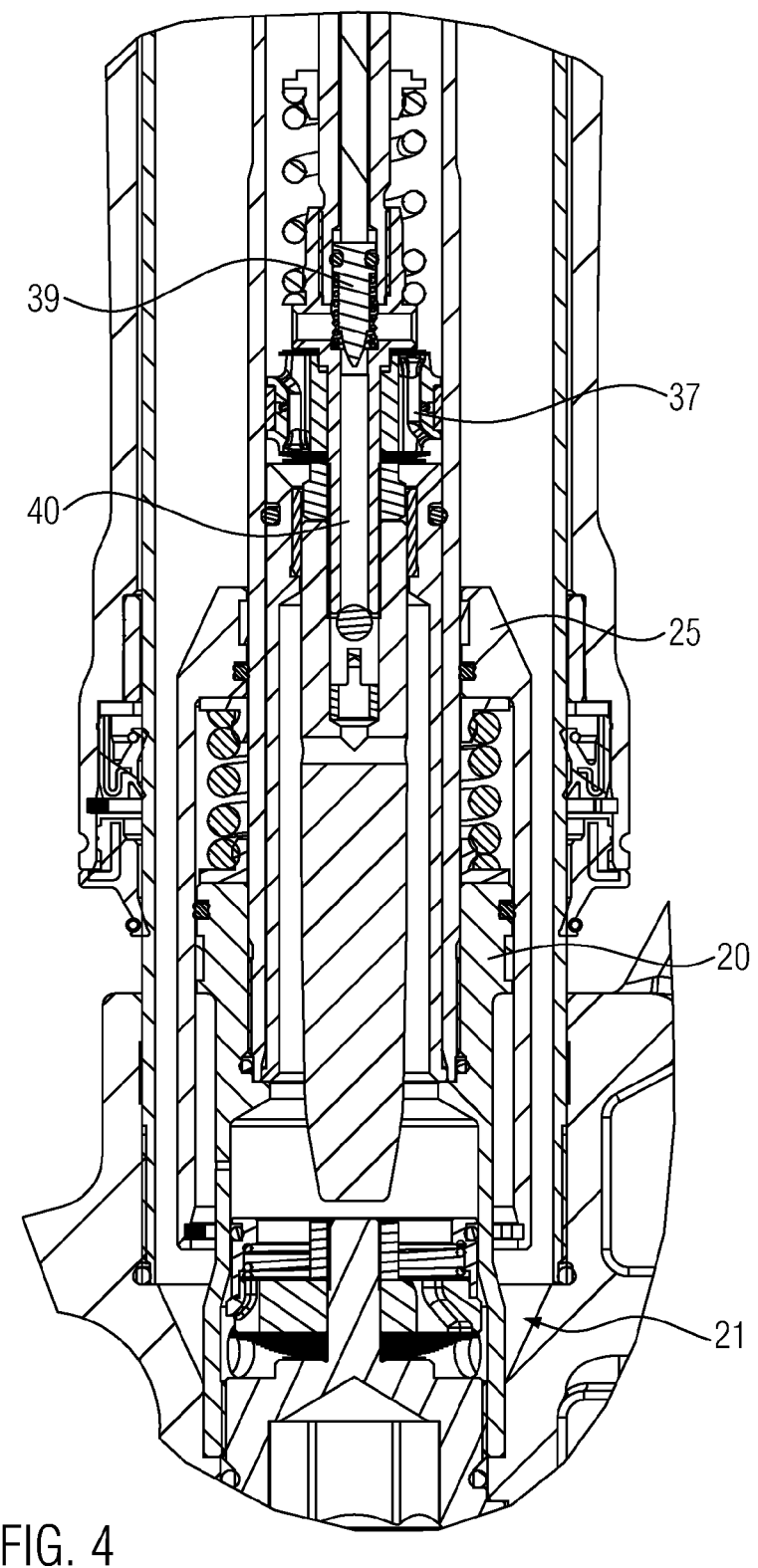
FIG. 4 is an enlarged view of the details of portion "D" according to FIG. 1A.

At the lower end of the damping tube 12 is provided a closure body 20, in the shape of a pipe section, which can be seen in further detail with reference to FIG. 4. The closure body 20 serves to receive a base valve 21 which can be seen in further detail with the aid of FIG. 3 and FIG. 4. Damping fluid can pass via the base valve 21 out from the damping tube 12 beneath the lower piston surface 18 into the region of the annular space chamber 15, as will be explained in further detail below.

Furthermore, as can be seen in further detail with reference to FIG. 1, a gripping clamp 22 is provided at the lower end of the telescopic suspension fork leg 1; the gripping clamp 22 serves to receive a half axle, not illustrated in further detail, of a front wheel of a motorcycle, generally according to convention.

Figure 2:
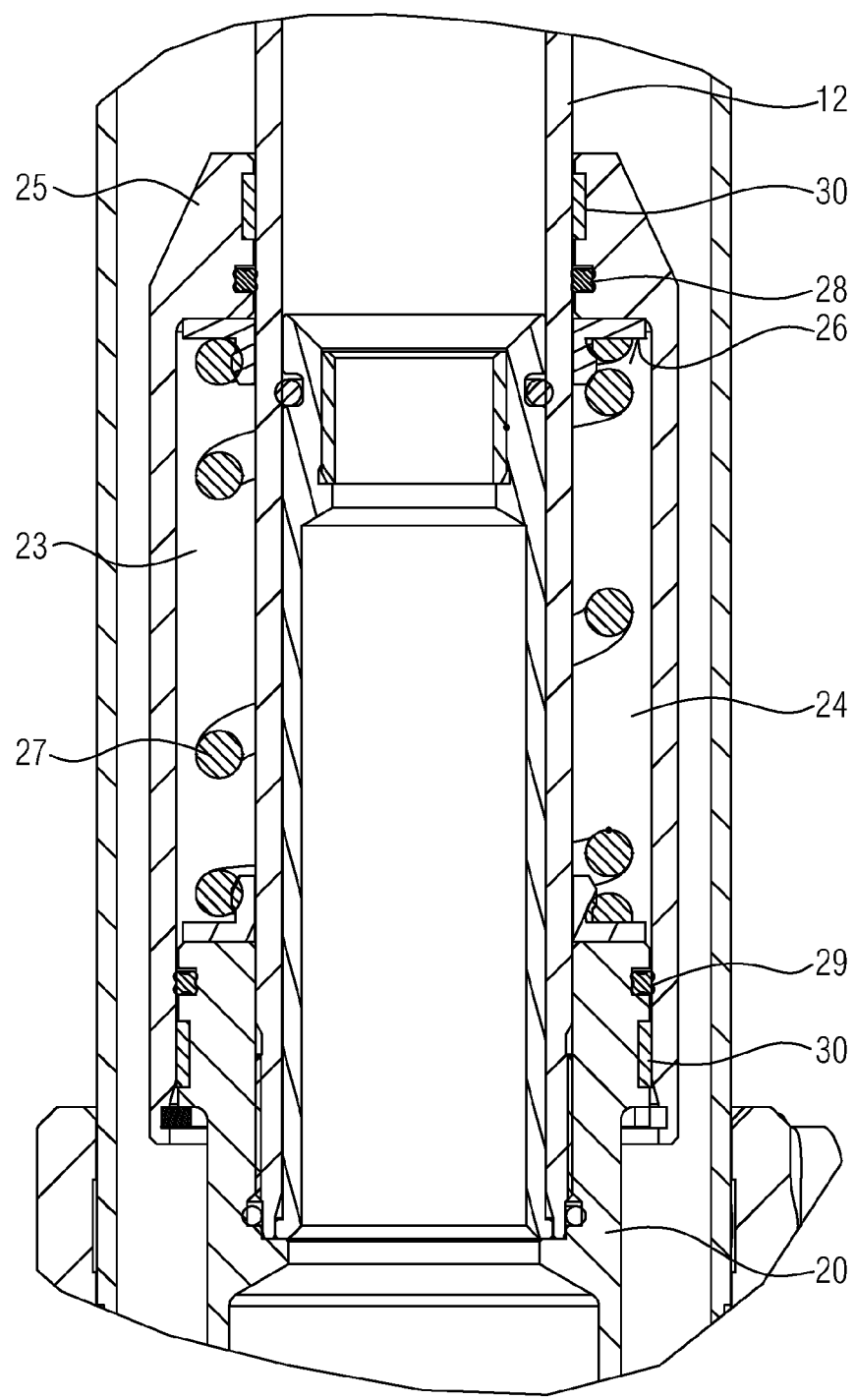
FIG. 2 is an enlarged view of the details of portion "B" according to FIG. 1.

In the region of the lower end of the damping tube 12 an equalizing volume 23 is provided for damping fluid which is displaced by the piston rod 13. As can be seen in further detail in FIG. 2, the equalizing volume 23 is defined in an annular space chamber 24, which is provided radially outside the damping tube 12 and radially inside a separating piston 25. The separating piston 25 is arranged on the closure body 20 and the damping tube 12 as best seen in FIG. 2. The equalizing volume 23 thus is provided concentrically between the damping tube 12 and the separating piston 25. The separating piston 25 fluidically separates the equalizing volume 23 from the damping fluid in the annular space chamber 15.

In the embodiment illustrated in FIG. 2, the separating piston 25 is constructed to have the shape of a truncated cone on its upper side, which is arranged lying opposite the lower piston surface 18 of the piston 16. As the separating piston 25 is disposed completely in the annular space chamber 15, it is surrounded on all sides by damping fluid and is therefore under system pressure. The separating piston 25 also has an end face 26 presented on its upper inside as best seen in FIG. 2, on which a spring arrangement 27 in the form of a helical compression spring rests. The opposite end of the spring 27 rests on an end face of the closure body 20, also as suggested in FIG. 2. The equalizing volume 23 is filled with a gas, for example air, and is sealed with respect to the damping fluid surrounding the separating piston 25 by means of an upper sealing arrangement 28 and a lower sealing arrangement 29.

The separating piston 25 is guided axially via two guide bushings 30 on the damping tube 12 and on the closure body 20, so that the piston is displaceable against the action of the helical compression spring 27 on the damping tube 12 and on the closure body 20. The displacement movement of the separating piston 25 is controlled here via the system pressure prevailing in the annular space chamber 15. The equalizing volume 23 increases and decreases according to the displacement movement of the separating piston 25.

A motorcycle (not illustrated) may be furnished with a telescopic suspension fork 31 having a pair of suspension fork legs 1, 1 according to the present disclosure, as well as two fork bridges 32, as seen in FIG. 5 of the drawings. When a motorcycle so equipped travels over unevenness in the ground, then owing to the impulse response of the telescopic suspension fork 31 a compression process of the telescopic suspension fork legs 1 occurs in the direction of the directional arrow F seen in FIG. 1.

Figure 1A:
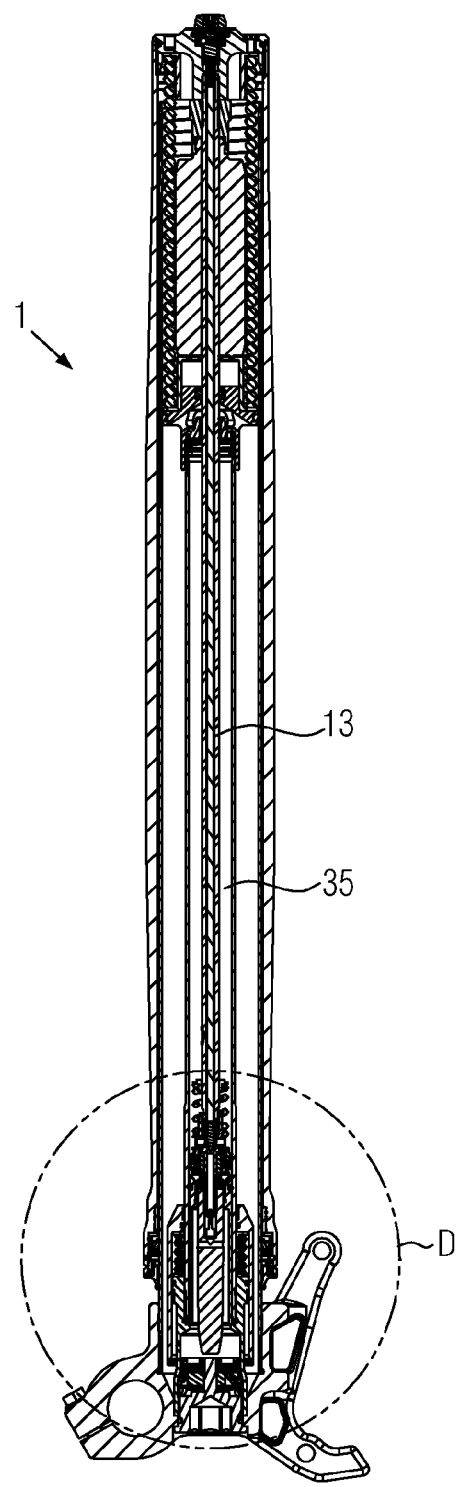
FIG. 1A is a longitudinal sectional view of the embodiment according to FIG. 1, shown in the compressed condition.

When the telescopic suspension fork legs 1 are completely compressed, they assume the position illustrated in FIG. 1A. On the compression process, the inner tube 2 is moved in an upward direction relative to the outer tube 3, because the piston 16 rests (via the piston rod 13) on the closure cover 6, which is located in the vicinity of the upper fork bridge 32; the lower piston surface 18 displaces damping fluid out from the region of the interior volume 14 beneath the lower piston surface 18. The piston rod 13 plunges into the damping arrangement 4, and displaces a corresponding volume of fork oil. A partial volume flow of the damping fluid thus is directed (via the base valve 21, FIG. 3) in the direction towards the annular space chamber 15. Through the application of pressure by the piston 16, an opening is brought about of a stack of spring discs 33 (also seen in FIG. 3) of the base valve 21; this creates a fluid passage in the base valve, making possible a fluid flow out from the interior volume 14 into the annular space chamber 15.

The damping fluid flowing into the annular space chamber 15 flows via a non-return valve 34, opened by the system pressure, into the region of an interior 35 (seen in FIG. 1A) in the damping tube 12, which interior 35 is defined above the upper piston surface 17. In this manner, the damping fluid in the second chamber 9 is constantly under pressure, preventing the formation of gas bubbles.

As can be seen with the aid of FIG. 1A, in the compression process of the telescopic suspension fork leg 1, the piston rod 13 enters into the second chamber 9 and into the interior 35 within the damping tube 12, and displaces damping fluid which is there present. The volume of damping fluid corresponding to the entering volume of the piston rod 13 is equalized via a relocation movement of the separating piston 25 and an accompanying change in the volume of the equalizing volume 23.

Figure 4A:
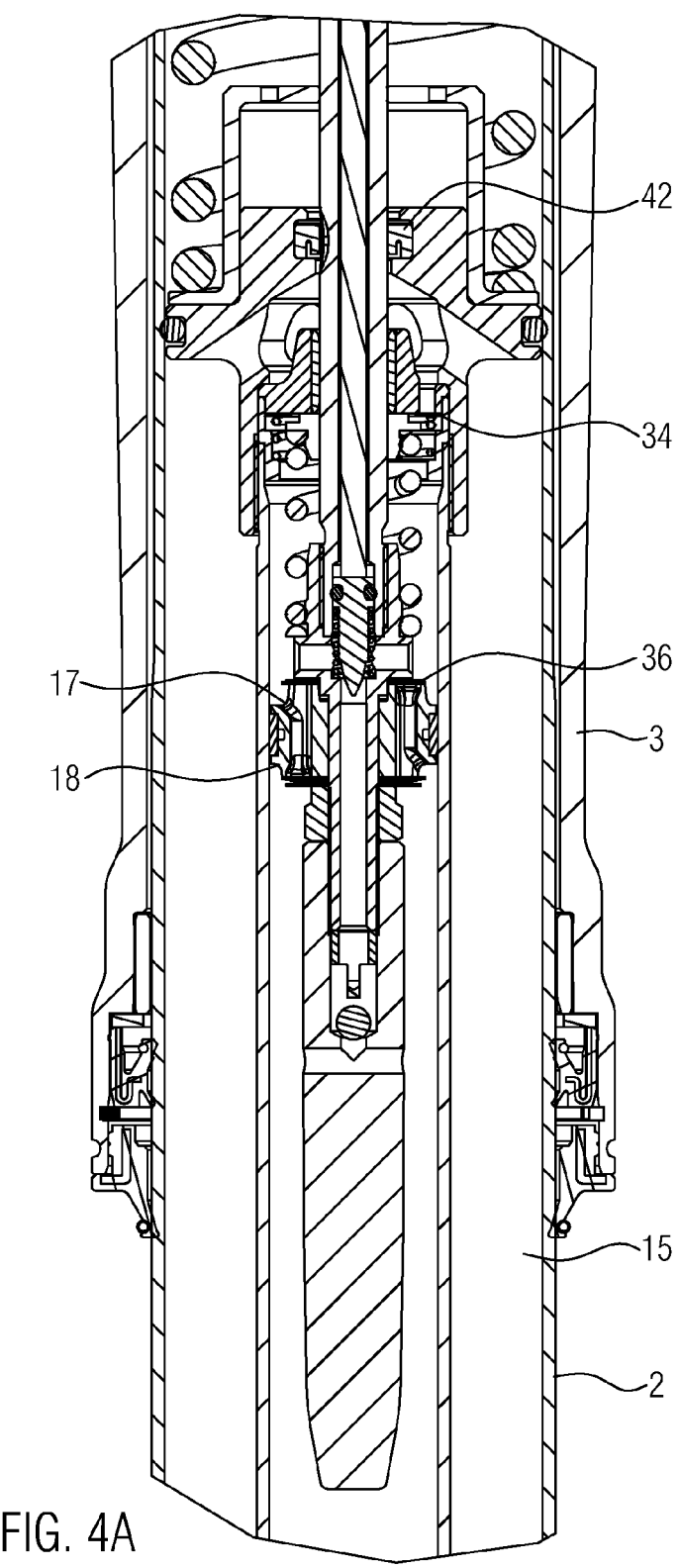
FIG. 4A is an enlarged view of the details of portion "A" according to FIG. 1.

FIG. 4 shows the relative position of the separating piston 25 within a fully compressed telescopic suspension fork leg 1, which corresponds to the position according to FIG. 1A. The oil volume beneath the lower piston surface 18 is under damping pressure, and is directed via the base valve 21 partially into the annular space chamber 15. A partial volume flow flows via a valve arrangement 36 (FIG. 4A), having a harder spring characteristic than the spring characteristic of the valve arrangement of the base valve 21, into the region of the interior 35.

By the displacement of damping fluid out from the damping tube 12 due to the entry of the piston rod 13 into the damping tube 12 and the damping arrangement 4, a relocation movement of the separating piston 25 occurs. This separating piston movement takes place against the action of the spring arrangement 27 and of the gas present inside the equalizing volume 23, in a downward direction, until the separating piston 25 (with complete compression of the telescopic suspension fork leg 1) has reached the final position seen in FIG. 1A.

If a compression of the telescopic suspension fork leg 1 occurs, but not a complete compression (as illustrated in FIG. 1A), then the separating piston 25 is likewise displaced in a downward direction. The equalizing volume 23 thus is reduced according to the volume reduction from the penetration of the piston rod 13 into the second chamber 9, which volume is available for receiving damping fluid—and thus provides for an oil volume equalization.

The equalization volume 23 is defined concentrically around the damping tube 12 and inside the annular space chamber 24 which is formed by the separating piston 25 and the damping tube 12. The equalization volume 23 therefore does not take up any significant installation space which would induce an increase in the axial length of the telescopic suspension fork leg 1. By the placement of the equalizing volume 23 directly adjacent radially to the damping tube 12, the radial installation space of the telescopic suspension fork 1 also does not increase, in distinction from one of the known dampers described hereinabove.

When the extension process of the telescopic suspension fork leg 1 occurs, if therefore the axial distance between the gripping clamp 22 and the closure cover 6 again increases, the piston 16 moves in the damping tube 12 in an upward direction; damping fluid is displaced by the upper piston surface 17 out from the interior 35 towards the interior volume 14 under the piston 16. The piston rod 13 accordingly also is moved out from the damping tube 12; the piston 16 displaces oil, which moves out from the interior 35 via a fluid passage 37 (FIG. 4) in the piston 16 towards the interior volume 14 beneath the piston 16. A valve arrangement 34 (FIG. 4A) is provided in the damping tube 12 above the piston 16; this valve arrangement acts as a non-return valve which, on a movement of the piston 16 in an upward direction, keeps closed a fluid passage out from the interior 35 in the direction towards the annular space chamber 15. This configuration thus provides that the damping fluid is moved from above the upper piston surface 17 and through the fluid passage 37 in the direction towards the interior volume 14 beneath the lower piston surface 18.

On the extension movement of the telescopic suspension fork leg 1, the piston rod 13 moves out from the damping system 4 and frees (increases) volume in the damping system 4. As the separating piston 25 is prestressed by the gas in the equalizing volume 23 and the spring arrangement 27, it moves in an upward direction with the piston rod 13 moving out from the damping tube 12, and the equalizing volume 23 takes up again the volume of damping fluid which is freed by the piston rod 13; this provides that both piston surfaces 17, 18 remain under pressure, and the entire second chamber 9 is under pressure.

By means of a valve arrangement 39 (which is shown in FIGS. 1 and 4) in the form of a needle valve that can be actuated from the exterior, a fluid duct 40 penetrating the piston 16 can be freed in an adjustable manner. Thereby, in connection with a non-return valve, a controlled adjustment of the damping force can be achieved on compression and extension.

On the compression process, the piston rod 13 moves into the damping system. Consequently, the piston 16 displaces fork oil, which flows at a greater partial volume flow through the base valve 21 with a weak valve characteristic, out from the damping tube 12. From there, the displaced fork oil arrives via the annular space chamber 15 and passages in the cartridge cover 10 (through the non-return valve 34) into the region above the upper piston surface 17, and acts directly upon the latter.

A smaller partial volume flow flows directly through the fluid passage 37 of the piston 16. The oil volume which is displaced due to the compression movement of the piston rod 13 is compensated by a relocation movement of the separating piston 25 and an accompanying reduction of the equalizing volume 13.

The separating piston 25 is arranged in an annular shape around the damping tube 12, and is guided axially by means of the guide bushings 30 on damping tube 12 and on the closure body 20 in the shape of a pipe section, and (owing to the sealing arrangement 28 and 29) has a closed inner volume which contains gas and forms the equalizing volume 23.

The spring arrangement 27 acts in an upward direction upon the separating piston 25. The separating piston 25 has an upper surface in the shape of a truncated cone, acted upon by the damping pressure, and the projection of which is greater than the lower surface of the separating piston 25 (which also is acted upon by the system pressure). This latter piston therefore has a differential piston surface which is acted upon by the system pressure such that the separating piston 25 is moved in a downward direction in the case of an increasing system pressure.

Thereby, the damping system 4 is acted upon with an increasing stroke of the telescopic suspension fork leg 1, and hence increasing relocation movement of the damping piston (or piston 16) with increasing pressure. The interior volume 14 between the lower piston surface 18 and the base valve 21 is under damping pressure; the remainder of the second chamber 9 is under system pressure.

On the extension movement, the piston rod 13 is moved out from the damping tube 12. The piston 16 displaces fork oil, which flows directly through the fluid passage 37 in the piston 16 from the interior 35 above the piston 16 into the interior volume 14 beneath the piston 16. Meantime, the non-return valve 34 is closed for the compression movement. The volume becoming free by the moving out of the piston rod 13 from the damping tube 12 is pushed back by the upwardly moving separating piston 25 via a non-return valve 41 (FIG. 3), for the extension into the damping tube 12 into the interior volume 14 beneath the piston 16. The space between the piston 16 and the non-return valve 34 for the compression is under damping pressure; the remainder of the second chamber 9 is under system pressure, which is determined by the separating piston 25.

With regard to features of the invention which are not explained in textual detail above, reference is also to be made expressly to the corresponding drawings.

LIST OF REFERENCE NUMBERS 1 telescopic suspension fork leg
2 inner tube
3 outer tube
4 damping arrangement
5 spring arrangement
6 closure cover
7 cover constructed in a cup shape
8 first chamber
9 second chamber
10 cartridge cover
11 sealing arrangement
12 damping tube
13 piston rod
14 interior volume
15 annular space chamber
16 piston
17 upper piston surface
18 lower piston surface
19 sealing arrangement
20 closure body
21 base valve
22 gripping clamp
23 equalizing volume
24 annular space chamber
25 separating piston
26 end face
27 spring arrangements
28 upper sealing arrangement
29 lower sealing arrangement
30 guide bushing
31 telescopic suspension fork
32 fork bridge
33 stack of spring discs
34 non-return valve for the compression
35 interior
36 valve arrangement
37 fluid passage
39 valve arrangement (needle valve)
40 fluid duct
41 non-return valve for the extension
42 piston rod seal
F: arrow Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

The invention claimed is:

1. A telescopic suspension fork leg comprising:
an inner tube and an outer tube;
a damping arrangement;
a spring arrangement disposed inside a first chamber defined in the outer tube and resting opposite a second chamber defined by the damping arrangement and arranged beneath the first chamber, which second chamber receives a damping fluid;
wherein the damping arrangement has a piston, resting on a piston rod, the piston comprising an upper piston surface and a lower piston surface, and
wherein the piston is movable within a damping tube arranged substantially concentrically to the inner tube, and the damping tube is surrounded by an annular space chamber arranged substantially concentrically to the damping tube, and
wherein the telescopic suspension fork leg has a compressible equalizing volume for a damping fluid volume which is displaced by the piston rod; and
wherein the equalizing volume is defined substantially concentrically between the damping tube and a separating piston that fluidically separates the equalizing volume from the annular space chamber.

2. The telescopic suspension fork leg according to claim 1, wherein the separating piston is arranged concentrically to the damping tube inside the annular space chamber, and has a differential piston surface which is acted upon by a pressure in the annular space chamber for movement relative to the piston.

3. The telescopic suspension fork leg according to claim 1, wherein the separating piston is prestressed against the force exerted by the differential piston surface by means of a spring arrangement disposed between an end face of the separating piston and a closure body in the shape of a pipe section.

4. The telescopic suspension fork leg according to claim 3, wherein the separating piston comprises a body in the shape of a pipe section, which is arranged so to be displaceable by means of two guide bushings on the damping tube and on the closure body, arranged concentrically to the damping tube, and wherein the equalizing volume is defined between an outer periphery surface of the damping tube and an inner periphery surface of the separating piston by means of sealing arrangements arranged there between.

5. The telescopic suspension fork leg according to claim 1, wherein the separating piston has an outer contour in the shape of a truncated cone at its region lying opposite an end region of the telescopic suspension fork leg provided with a gripping clamp.

6. The telescopic suspension fork leg according to claim 1, further comprising a valve arrangement fluidically connecting the damping tube with the annular space chamber upon a reaching of a predetermined damping pressure in the damping tube, such that damping fluid displaced by the lower piston surface out from the damping tube is displaceable via the annular space chamber to act upon the upper piston surface.

7. The telescopic suspension fork leg according to claim 1, wherein the piston has a fluid passage extending between the lower and the upper piston surfaces and which is freeable, by a valve arrangement actuatable by the damping pressure, for permitting passage of damping fluid there through.

8. The telescopic suspension fork leg according to claim 1, further comprising a non-return valve which, with increasing damping pressure in the damping tube above the upper piston surface, prevents a flow of damping fluid from the upper piston surface via the annular space chamber in a direction towards the lower piston surface.

9. The telescopic suspension fork leg according to claim 1, further comprising a non-return valve which frees a fluid flow between the annular space chamber and the damping tube, in the direction towards the lower piston surface, on a movement of the piston away from the separating piston.

10. The telescopic suspension fork leg according to claim 1, further comprising a valve arrangement for the adjustable freeing of a fluid duct penetrating the piston between damping fluid volume beneath the lower piston surface and damping fluid volume above the upper piston surface.

11. The telescopic suspension fork leg according to claim 10, wherein the separating piston partially defines an equalizing volume which corresponds to an entire damping fluid volume displaced by the piston rod.

12. A telescopic suspension fork comprising an upper fork bridge, a lower fork bridge, and two telescopic suspension fork legs according to claim 1.

13. A telescopic suspension fork leg comprising:
an inner tube and an outer tube;
a damping arrangement;
a spring arrangement disposed inside a first chamber defined in the outer tube and resting opposite a second chamber defined by the damping arrangement and arranged beneath the first chamber, which second chamber receives a damping fluid;
wherein the damping arrangement comprises a piston, resting on a piston rod, the piston comprising an upper piston surface and a lower piston surface, and
wherein the piston is movable within a damping tube arranged substantially concentrically to the inner tube, and the damping tube is surrounded by an annular space chamber arranged substantially concentrically to the damping tube, and
wherein the telescopic suspension fork leg has a compressible equalizing volume for a damping fluid volume which is displaced by the piston rod, and
wherein the equalizing volume is defined substantially concentrically between the damping tube and a separating piston that fluidically separates the equalizing volume from the annular space chamber; and
wherein further the separating piston is arranged concentrically to the damping tube inside the annular space chamber, and comprises a differential piston surface which is acted upon by a pressure in the annular space chamber for movement relative to the piston.

14. The telescopic suspension fork leg according to claim 13, wherein the separating piston is prestressed against the force exerted by the differential piston surface by means of a spring disposed between an end face of the separating piston and a closure body in the shape of a pipe section.

15. A telescopic suspension fork leg comprising:
an inner tube and an outer tube;
a damping arrangement;
a spring arrangement disposed inside a first chamber defined in the outer tube and resting opposite a second chamber defined by the damping arrangement and arranged beneath the first chamber, which second chamber receives a damping fluid;
wherein the damping arrangement has a piston, resting on a piston rod, the piston comprising an upper piston surface and a lower piston surface, and
wherein the piston is movable within a damping tube arranged substantially concentrically to the inner tube, and the damping tube is surrounded by an annular space chamber arranged substantially concentrically to the damping tube, and
wherein the telescopic suspension fork leg has a gas-filled compressible equalizing volume for a damping fluid volume which is displaced by the piston rod and piston; and
wherein the equalizing volume is defined substantially concentrically between the damping tube and a separating piston that fluidically separates the equalizing volume from damping fluid in the annular space chamber.

16. The telescopic suspension fork leg according to claim 15, wherein the separating piston is arranged concentrically to the damping tube inside the annular space chamber, and has a differential piston surface which is acted upon by a pressure in the annular space chamber for movement relative to the piston.

17. The telescopic suspension fork leg according to claim 16, wherein the separating piston is prestressed against the force exerted by the differential piston surface by means of a spring arrangement disposed between an end face of the separating piston and a closure body in the shape of a pipe section.

18. The telescopic suspension fork leg according to claim 17, wherein the separating piston comprises a body in the shape of a pipe section, which is arranged so to be displaceable by means of two guide bushings on the damping tube and on the closure body, arranged concentrically to the damping tube, and wherein the equalizing volume is defined between an outer periphery surface of the damping tube and an inner periphery surface of the separating piston by means of sealing arrangements arranged there between.

19. The telescopic suspension fork leg according to claim 15, wherein the separating piston has an outer contour in the shape of a truncated cone at its region lying opposite an end region of the telescopic suspension fork leg provided with a gripping clamp.

20. The telescopic suspension fork leg according to claim 15, further comprising a valve arrangement fluidically connecting the damping tube with the annular space chamber upon a reaching of a predetermined damping pressure in the damping tube, such that damping fluid displaced by the lower piston surface out from the damping tube is displaceable via the annular space chamber to act upon the upper piston surface.

* * * * *